2 Sheets--Sheet 1.

H. ALDRIDGE.

Improvement in Horse-Powers.

No. 4,379. Reissued May 16, 1871.

*Witnesses.*

H. H. Doubleday

Alexr. Mahon

*Inventor.*

Hiram Aldridge ap'd to

Cornelius Aultman by A. M. Smith attorney

AM. PHOTO-LITHOGRAPHIC CO. N.Y. (OSBORNE'S PROCESS.)

2 Sheets--Sheet 2.

H. ALDRIDGE.

Improvement in Horse-Powers.

No. 4,379. Reissued May 16, 1871.

AM. PHOTO-LITHOGRAPHIC CO. N.Y. (OSBORNE'S PROCESS.)

UNITED STATES PATENT OFFICE.

HIRAM ALDRIDGE, OF ELIZABETHTOWN, NEW MEXICO TERRITORY, ASSIGNOR, BY MESNE ASSIGNMENTS, TO CORNELIUS AULTMAN, OF CANTON, OHIO.

IMPROVEMENT IN HORSE-POWERS.

Specification forming part of Letters Patent No. 68,829, dated September 17, 1867; reissue No. 4,379, dated May 16, 1871.

*To all whom it may concern:*

Be it known that I, HIRAM ALDRIDGE, formerly of Goshen, in the county of Elkhart and State of Indiana, but now of Elizabethtown, Colfax county, Territory of New Mexico, have invented certain new and useful Improvements in Portable Horse-Powers, of which the following is a full, clear, and exact description, reference being had to the accompanying drawings, making part of this specification, in which—

Figure 1:
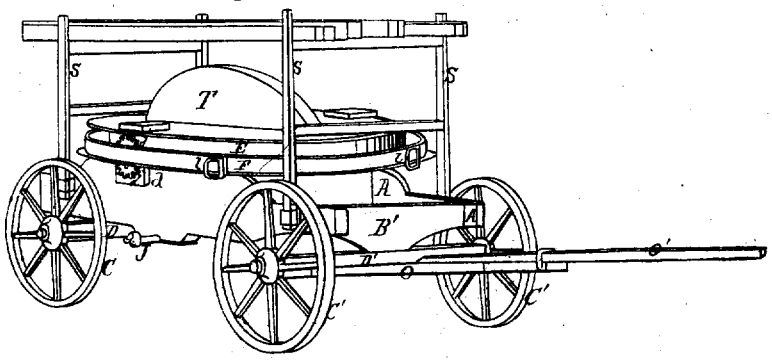
Figure 2:
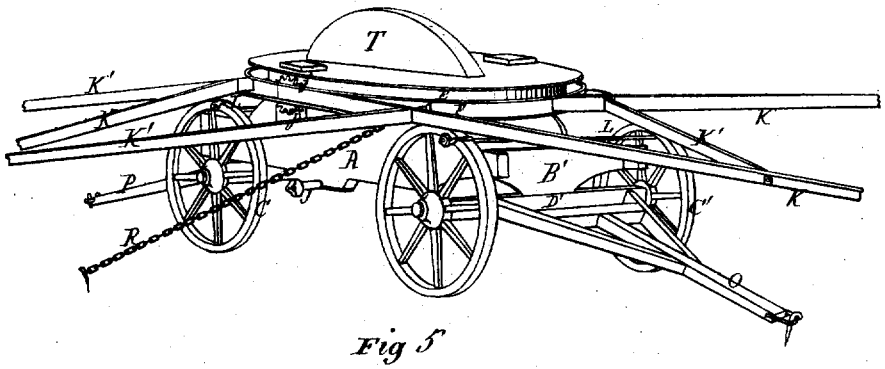
Figure 5:
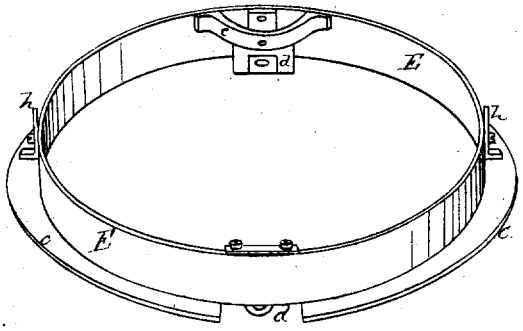
Figure 3:
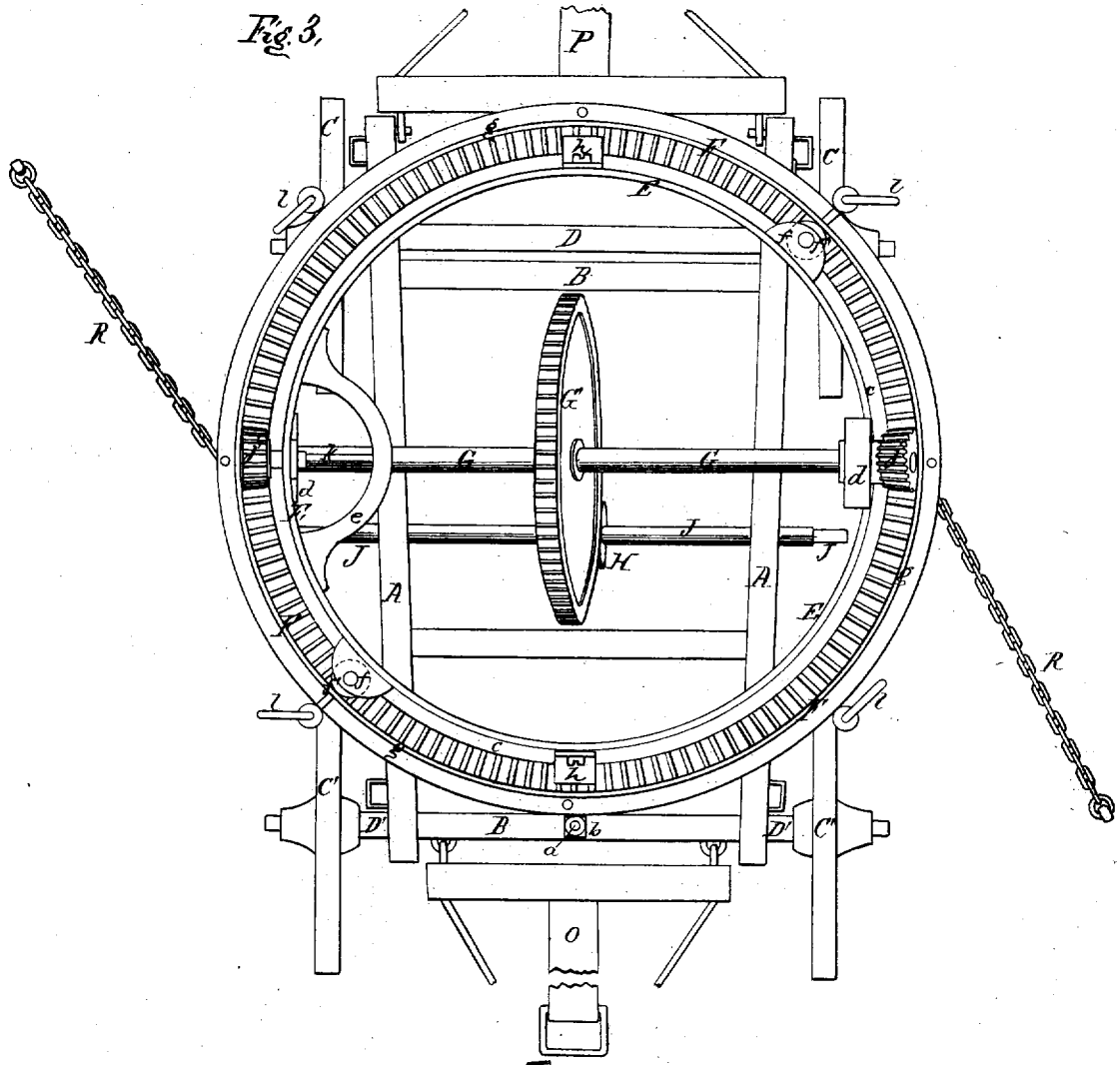
Figure 4:
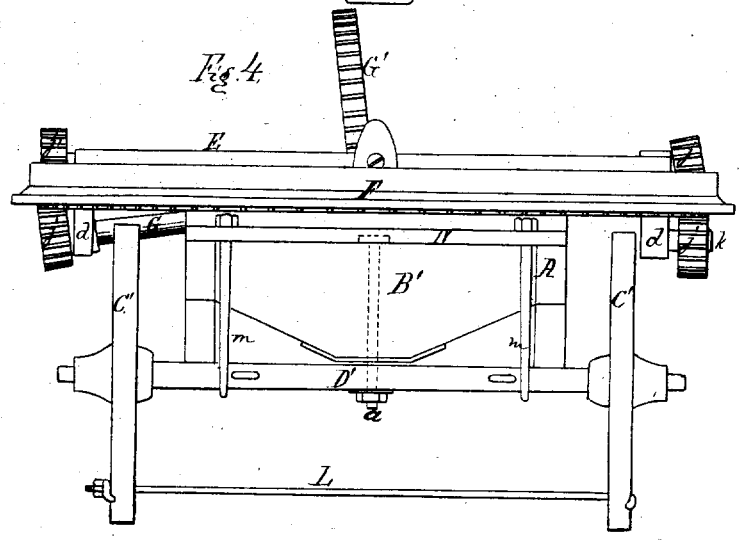

Figure 1 is a perspective view, showing the improved portable horse-power arranged for transportation. Fig. 2 is a perspective view of the horse-power staked to the ground, and arranged for operation. Fig. 3 is a top view of the horse-power, showing more particularly the construction. Fig. 4 is an elevation of the front end of the same. Fig. 5 is a view of the metallic circular bearing-frame detached from the carriage-frame.

Similar letters of reference indicate corresponding parts in the several figures.

This invention relates to certain novel improvements on portable horse-powers which are mounted upon and applied permanently to four-wheel carriages, so that they can be transported from one place to another with facility, without having to employ a separate conveyance for this purpose.

The invention relates particularly to that well-known class of powers which have their sweep-levers applied to a horizontal spurred ring revolving around and communicating motion to a central master-wheel, although the invention is not confined to this peculiar class of powers, but may include any of them which are adapted for being mounted upon transporting-wheels permanently.

The main object of the invention is to adapt horse-powers which are mounted upon four transporting-wheels to be operated successfully while resting upon said wheels, by the employment of certain contrivances which shall securely lock and hold the wheels, and stake the machine immovably upon the ground, as will be hereinafter described.

The invention also consists in a metallic frame or ring, which is applied upon the top of the carriage-frame, and so constructed as to afford substantial and unyielding bearings for the shafts composing parts of the horse-power, and also serve as a support and guide for the spurred ring which encircles its circumference, as will be hereinafter described. It further consists in a driving-shaft arranged beneath the driving-power and transporting-frame in open-bottom hangers, and adapted to serve as a means of communicating motion from either side of the machine to thrashing and other machinery, as will be hereinafter explained. It finally consists in the application, to a portable four-wheeled horse-power, of an auxiliary supporting-frame, which is removable at pleasure, and which is adapted to receive and carry the sweep-levers and their braces and other parts of the machine which are not in use during the transportation of the machine from one place to another.

To enable others skilled in the art to understand the invention, one practical mode of carrying it into effect will be described.

The carriage-frame, upon which the horse-power is mounted and permanently secured, consists of two longitudinal side beams, A A, connected together near their front and rear ends by means of transverse beams B B′, the latter one of which is adapted to serve as a bolster over the front axle, as shown in Fig. 4. This rectangular frame is mounted upon four transporting-wheels, C C and C′ C′, which are applied on the ends of their respective axles D D′. The rear axle D is secured rigidly to the carriage-frame, and the front axle D′ is connected centrally to the front cross-beam or bolster B′ by means of a vertical king-bolt, *a*, which has a clamping-nut, *b*, screwed upon its upper end, by means of which the axle D′ can be secured rigidly to its frame or loosened, at pleasure. On top of the carriage-frame, and secured rigidly to it, is an annular metallic frame, E, which is constructed of one piece of metal, and provided with a base-flange, *c*, hangers *d d*, and a bracket, *e*. This ring-frame has also secured to it, at suitable points, roller-bearings *f f* for carrying the anti-friction roller-guides *f′ f′*, which bear against the inner surface of a flange, *g*, formed upon a spurred ring, F, as shown in Fig. 3. At proper intervals from said roller-guides $f'$ $f'$, holding-down plates or brackets $h$ $h$, are secured to the circumference of the ring-frame E, for preventing the toothed ring F from springing up out of place. The ring F is constructed with teeth upon its upper and lower surfaces inside of the annular flange $g$, which teeth engage with pinion spur-wheels $j$ $j$ and $j'$ $j'$, the former two of which are keyed upon the ends of the inclined master-wheel shaft G, and the latter two, $j'$ $j'$, are applied loosely upon fixed shafts $k$ $k$, which are supported by ring-frame E. The shaft G is inclined so that its pinion spur-wheels will both engage with and be driven by the teeth on ring F, one wheel engaging with the upper set of teeth, and the other wheel engaging with the lower set of teeth.

At regular intervals apart, upon the circumference of the ring F, links or loops $l$ $l$ $l$ $l$ are pivoted, for allowing of the attachment of arms or sweeps K K, and their tangent braces K′ K′. The arms K are passed through the loops $l$ $l$, and attached at one end to the circumferential flange of ring F by bolts or pins, and the braces K′ are hooked at one end to the loop $l$, and pivoted at the opposite ends to the arms K, as shown in Fig. 2. When the spurred ring F is revolved about its axis, its teeth will communicate a rotary motion to the inclined shaft G, upon which is keyed the master-wheel G′. This wheel G′ engages with the teeth of a pinion, H, which is keyed upon a horizontal transverse shaft, J, mounted in hangers or bearings formed in one piece with or attached to the frame-work, said hangers being open at the bottom or under side, so that the shaft can be removed without disturbing the rest of the machinery. This shaft J thus receives a rapid rotary motion from the master-wheel, which motion can be communicated to various kinds of machines through the medium of tumbling-shafts, connected to one or both ends of said shaft by means of suitable couplings. By having this shaft J project out suitable distances from the sides of the carriage-frame, and providing both its ends with couplings, it will be seen that this shaft will afford two different coupling-hitches at one time, which is of great importance, especially in operating thrashing-machines and separators. The "three-hitch" gear is now generally used for driving thrashing-cylinders, the "two-hitch" on the left of such cylinders requiring a "haw-hitch," and the one on the right a "gee-hitch." The shaft J affords a haw and gee motion always with haw-draft. The mode of locking the wheels upon which the power is mounted, and securing the machine to the ground, so that said wheels shall rest upon the ground during the operation of the power, and afford a substantial support therefor, is as follows: For each pair of transporting-wheels a clamping-rod, L, (shown in Figs. 2 and 4,) is employed, which rod is hooked around the felly of one wheel, and passed through the eye of a hook which embraces the felly of the opposite wheel; then, by means of a nut applied upon said rod, the two wheels are drawn tightly, so that their hubs are caused to bear hard against the shoulders on the axles. The rear rod L may pass through the longitudinal beams of the carriage-frame, and thus secure the rear wheels to this frame, and prevent them from turning. The front axle D′ is secured against turning toward the right or left by means of the clamping-nut $b$, as before described, and also by means of vertical hooked rods $m$ $m$. (Shown in Fig. 4.) These rods $m$ are hooked under axle D′, near its extremities, and passed up through a transverse bar, N, which rests upon the frame-beams A A, and upon the upper ends of these rods nuts are screwed, so as to draw the axle tight, and hold it firmly in place. Instead of using the clamps L, above described, the front and rear wheels may be connected securely together on each side of the carriage by means of clamps and turn-buckles, or in any other suitable manner. The vibration of the machine being removed from the hub of the wheels, and the transporting-frame and forward axle being properly secured and bound firmly together, the machine is ready to be secured to the ground.

The hound-brace or lever O, which is pivoted to the front axle D′, is so arranged that the pole O′ can be detached from it at pleasure. The pole O′ is always detached previously to commencing the fastening of the machine to the ground, so as to leave the hounds to be used as the front brace by spiking its outer end down, as shown in Fig. 2. A similar brace, P, is attached to the rear axle D, and its outer end spiked down to the ground. To complete the fastening of the machine to the ground, two chains or ties, R R, are employed, which are securely attached to the sides of the machine and carried off in opposite directions, as shown in Figs. 2 and 3, and spiked down, so that they serve as ties for preventing the machine from moving out of place during the operation of the power. Instead of chains R, rigid beams or rods may be employed for fastening the machine in place upon the ground. A removable frame is provided for receiving and supporting the sweep-levers, stakes, and other parts used in securing the machine rigidly in place upon the ground, which frame consists of uprights connected together by cross-bars and inserted into staples in the sides of the transporting-frame, as shown in Fig. 1. When the horse-power is to be used the frame S is removed, so as to leave the upper portion of the machine clear of the sweep-levers to pass around. The platform T upon the machine serves as a covering and protection for the gearing, and also affords a support for the driver, as shown in Figs. 1 and 2.

I am aware that horse-powers have been mounted upon wheels before my invention, for the purpose of transporting them from one a covering and protection for the gearing, and also affords a support for the driver, as shown in Figs. 1 and 2.

I am aware that horse-powers have been mounted upon wheels before my invention for the purpose of transporting them from one place to another; but I am not aware that any power has been permanently mounted upon four wheels and operated with all of the wheels standing on the ground.

By placing the power upon four wheels instead of two I am enabled to get a support for each end of my frame-work, thus obviating the necessity of connecting said frame to the braces, besides making it stand much steadier; and, if it were thought advisable, the braces could be dispensed with and the machine secured to the ground by chains or ties alone, which could not be done where but two wheels are used. This frame does not require to be elevated and supported so as to raise the wheels from the ground, and the driving and coupling shaft J is always held at a given height from the ground. For these and other reasons a single person can, in a few minutes, arrange a horse-power for operation, whereas several persons are required to attend the horse-powers hitherto used for the purpose of lifting and adjusting them in position for operation.

Having now described the invention, what is claimed as new, and sought to be secured by Letters Patent, is—

1. In combination with the rear axle of a horse-power mounted upon four wheels, the braces or triangular frame P, for holding said axle to the ground, applied in such manner that they can be turned up into a vertical or nearly vertical position for transportation, substantially as described.

2. In combination with the transporting-wheels of a portable horse-power, locking devices for locking the wheels to the carriage or truck for the purpose of preventing them from turning upon their axles, substantially as described.

3. Locking devices applied to the front axle of a four-wheeled portable horse-power to prevent said axle from turning when the power is in operation, substantially as described.

4. The construction and arrangement of the pinion-shaft J, whereby it is adapted to receive a coupling-shaft upon either end, as set forth.

5. The ring F, adapted to support the master-wheel, substantially as set forth.

6. In combination with a portable horse-power, an auxiliary transporting-frame, which can be moved out of the way of the sweeps when the power is in operation.

7. In combination with a mounted horse-power, a tie or ties, arranged at the side of the machine for the purpose of preventing it from being overturned, substantially as set forth.

8. In a mounted horse-power, a tie or ties, arranged at the side of the machine for the purpose of preventing it from being overturned, in combination with a brace or braces, which support it (the machine) against the thrust or twisting strain imparted by the horses.

9. I claim the combination of the line-shaft J with the frame of the machine by means of open-bottomed hangers, which permit said shaft to be readily removed without disturbing the other parts of the gearing.

HIRAM ALDRIDGE.

Witnesses:
JOHN GERTERSEN,
L. P. HAYSLIP.